(12) United States Patent
Kimoto et al.

(10) Patent No.: US 7,319,305 B2
(45) Date of Patent: Jan. 15, 2008

(54) BATTERY PACK APPARATUS WITH CONTROL SECTION

(75) Inventors: Shinya Kimoto, Toyohashi (JP); Takaki Kobayashi, Nagoya (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 372 days.

(21) Appl. No.: 10/816,836

(22) Filed: Apr. 5, 2004

(65) Prior Publication Data
US 2004/0207368 A1    Oct. 21, 2004

(30) Foreign Application Priority Data
Apr. 16, 2003    (JP) ............... 2003-110964

(51) Int. Cl.
*H01M 10/46* (2006.01)
(52) U.S. Cl. ..................................... 320/150
(58) Field of Classification Search ............... 320/107, 320/112, 150
See application file for complete search history.

(56) References Cited

U.S. PATENT DOCUMENTS 5,991,665 A * 11/1999 Wang et al. ............... 607/61
6,411,063 B1 * 6/2002 Kouzu et al. ............... 320/150
6,667,129 B2   12/2003 Chikada
6,781,349 B2 * 8/2004 Kimura et al. ............. 320/150

FOREIGN PATENT DOCUMENTS

JP    11180168    7/1999

OTHER PUBLICATIONS

English Language Abstract of JP 11-180168.

* cited by examiner

*Primary Examiner*—Edward H Tso
(74) *Attorney, Agent, or Firm*—Workman Nydegger

(57) ABSTRACT

A battery pack apparatus including a battery pack having a plurality of rechargeable batteries arranged in parallel, with a cooling medium passage interposed therebetween, a cooling medium feeding device for feeding a cooling medium through the cooling medium passages, and a control section for controlling the charge and discharge of the battery pack. In this configuration, the battery pack apparatus is divided into a first unit including the battery pack and the cooling medium feeding device and a second unit having the control section accommodated in a case. The battery pack of the first unit is connected with the control section of the second unit by means of a harness or metallic connecting member.

5 Claims, 3 Drawing Sheets

BATTERY PACK APPARATUS WITH CONTROL SECTION

The present disclosure relates to subject matter contained in priority Japanese Patent Application No. 2003-110964, filed on Apr. 16, 2003, the contents of which is herein expressly incorporated by reference in its entirety.

BACKGROUND OF THE INVENTION

1. Field of the Invention

The present invention relates to a battery pack apparatus including a battery pack having a plurality of rechargeable batteries and a control section for controlling the charge and discharge of the battery pack.

2. Description of the Related Art

In a battery pack having a plurality of rechargeable batteries, the battery temperature tends to rise due to heat generation caused by charge and discharge of the batteries, which induces decrease of the battery output, the charge/discharge efficiency and the battery lifetime. To cope with such problem, it has been conventionally known that a battery pack apparatus includes a battery pack composed of a plurality of rechargeable batteries arranged in parallel, with cooling medium passages interposed therebetween and a device for feeding cooling medium through the cooling medium passage.

As another known apparatus, FIG. 4 shows a configuration of a battery pack apparatus in which a combination of such a battery pack and a cooling medium feeding device is further provided with a control section for controlling the charge and discharge of the battery pack. Referring to FIG. 4, a battery pack arrangement space 32 and a control section arrangement space 33 are set side by side along a longitudinal direction inside a case 31, and a battery pack 34 is disposed in an inclined posture in the battery pack arrangement space 32. A cooling medium feeding device 36 is connected to one end of a feeding space 35 that is defined between one side face of the battery pack 34 and the opposing wall of the case 31. A discharging space 37 is defined between another side face of the battery pack 34 and the opposing wall of the case 31, and an end of this discharging space 37 is connected to one end of a discharging passage 38 provided in the control section arrangement space 33 while the other end of the discharging passage 38 is opened to the outside of the case 31. Further, there is provided, in the discharging passage 38, a cooling fin 40 thermally coupled to a control section 39 arranged within the control section arrangement space 33 for performing heat exchange with cooling medium (see Japanese Patent Laid-Open Publication No. Hei 11-180168, for example).

However, in a battery pack apparatus such as disclosed in Japanese Patent Laid-Open Publication No. Hei 11-180168, the discharging passage 38 in the control section arrangement space 33 must be completely sealed to prevent cooling medium from entering the control section arrangement space 33. Otherwise, hydrogen gas or alkali mist emitted from the battery pack 34 or dust or similar will enter the control section 39 to cause adverse effects. Further, according to this conventional configuration in which heat from the control section 39 is dissipated to the cooling medium by means of the cooling fin 40, the heat transfer efficiency is low and hence the cooling efficiency is poor. Additionally, the provision of the cooling fin 40 increases the weight and cost.

SUMMARY OF THE INVENTION

In light of the foregoing problems, an object of the present invention is to provide a battery pack apparatus that is secure from adverse effects caused by a control section for controlling the charge and discharge being brought into contact with gas or mist emitted from a battery pack, and that is capable of cooling the control section effectively.

A battery pack apparatus according to the present invention includes a battery pack having a plurality of rechargeable batteries arranged in parallel, with a cooling medium passage interposed therebetween, a cooling medium feeding device for feeding a cooling medium through the cooling medium passage, and a control section for controlling the charge and discharge of the battery pack. The battery pack apparatus is divided into a first unit including the battery pack and the cooling medium feeding device and a second unit having the control section accommodated in a case, the battery pack of the first unit being connected to the control section of the second unit by means of a harness or metallic connecting member.

According to such a configuration, in which the battery pack apparatus is divided into the first unit having the battery pack and the second unit having the control section, there is no risk that hydrogen gas or alkali mist emitted from the rechargeable batteries enters the control section and the control section is adversely affected thereby, and hence high security is ensured. Also, since the first and second units are separate entities, the battery pack apparatus can be laid out with increased flexibility when mounted.

Further, a switch for turning electricity on and off may be provided at an input/output portion of the battery pack in the first unit, so that installation of the battery pack apparatus is performed safely and with good workability by connecting the first and second units with the switch opened by using the harness or metallic connecting member and then closing the switch.

Further, a vent hole may be provided at a lower part of the case of the second unit while an exhaust port being provided at the top of the case, so that the control section is directly cooled by natural convection of cooling air flowing in through the vent hole and flowing out through the exhaust port, and thus the control section is cooled effectively.

Still further, a vent hole may be provided at a lower part of the case of the second unit while an exhaust port being provided at the top of the case, and the exhaust port may be connected to a downstream side passage of the cooling medium passage in the cooling medium feeding device, so that cooling air is forcibly supplied to the inside of the case by the cooling medium feeding device and hence the control section is cooled still more effectively.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Now, a battery pack apparatus according to an embodiment of the present invention will be described with reference to FIGS. 1 and 2.

Figure 1:
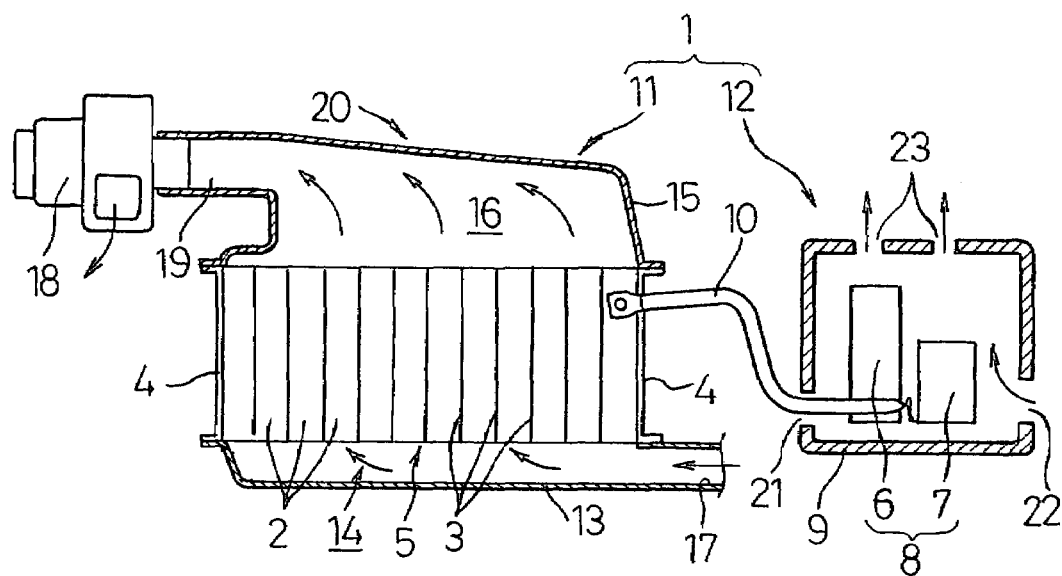
FIG. 1 is a longitudinal sectional front view schematically showing a configuration of a battery pack apparatus according to an embodiment of the present invention.

In FIG. 1, the reference numeral 1 denotes a battery pack apparatus serving as a driving power source for electric vehicles including hybrid powered vehicles and includes a first unit 11 and a second unit 12. The first unit 11 has a battery pack 5 composed of ten to thirty flat prismatic rechargeable batteries 2 (e.g. nickel-metal hydride rechargeable batteries equipped with a return safety vent) with a cooling medium passage 3 interposed between the long side faces of each pair of adjacent rechargeable batteries. The train of the rechargeable batteries 2 is held with a pair of end plates 4 arranged at the opposite ends of the train, and the thus obtained set is fixed integrally by a binding member (not shown). The second unit 12 includes a control section 8, that is composed of a controller 6 and a relay 7, for controlling the charge and discharge of the battery pack 5 and is accommodated in a case 9. The control section 8 is connected with the battery pack 5 by means of a harness or metallic connecting member 10.

Each of the rechargeable batteries 2 in the battery pack 5 is constituted as a battery module in which a plurality of cells (not shown) are arranged in parallel along the longitudinal direction of the long side faces of the rechargeable battery while being serially connected with one another. Terminals are provided to project from the opposite ends of the rechargeable battery for connection with the outside. The battery pack 5 provides a predetermined voltage by connecting sequentially the connection terminals on the opposite ends of the respective rechargeable batteries 2 by means of a bus bar (not shown).

In the first unit 11, a feeding passage 14 is defined between the bottom face of the battery pack 5 and a lower case 13 for distributing and feeding the cooling medium to the cooling medium passages 3, and a discharge passage 16 is defined between the top face of the battery pack 5 and an upper case 15 for collecting and discharging the cooling medium from the cooling medium passage 3. A feeding duct 17 is connected to the open end of the feeding passage 14, and an exhaust duct 19 equipped with an exhaust fan 18 is connected to the open end of the discharge passage 16. The foregoing members constitute a cooling medium feeding device 20.

In the second unit 12, a case 9 is provided at the lower part thereof with a through hole 21 for passing the harness or metallic connecting member 10 therethrough and with a vent hole 22 for introducing cooling air to the inside therethrough. The case 9 is further provided at the top wall thereof with an exhaust port 23 such that the exhaust port 23 is positioned above the control section 8 that is a heat generating element.

Figure 2:
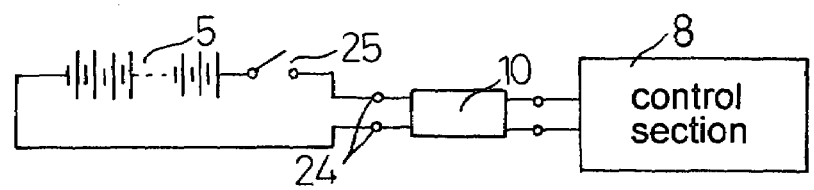
FIG. 2 is a circuit diagram of the embodiment.

Further, as shown in FIG. 2, the first unit 11 is provided with a switch 25 for turning electricity on and off, between the battery pack 5 and connection terminals 24 connected with the harness or metallic connecting member 10.

According to the foregoing configuration, since the battery pack apparatus 1 is divided into the first unit 11 having the battery pack 5 and the second unit 12 having the control section 8, there is no risk at all that hydrogen gas, alkali mist or the like emitted from the return safety vent of the rechargeable batteries 2 enters the control section 8. This totally eliminates those risks that hydrogen gas entering the relay 7 of the control section 8 comes into contact with sparks, or alkali mist entering the controller 6 or relay 7 poses adverse effects, and hence high security is ensured. In the second unit 12, additionally, outside air is introduced through the vent hole 22 at the lower part of the case 9, while air heated by the heat generation of the control section 8 is discharged from the exhaust port 23 formed at the top of the case 9, creating natural convection. Thereby, the control section 8 is directly cooled by the natural convection of cooling air and thus is cooled effectively.

Further, since the battery pack apparatus 1 is divided into the first unit 11 and the second unit 12, which are connected by the harness or metallic connecting member 10, the battery pack apparatus 1 can be laid out with increased flexibility when mounted. For example, the battery pack apparatus 1 can be mounted in the width direction of a vehicle by arranging the first unit 11 and the second unit 12 separately on either side of the width-wise and arranging the harness or metallic connecting member 10 to cross a center tunnel section in the middle of the width.

Further, the battery pack apparatus 1 can be installed safely and with good workability by opening the switch 25 when the first unit 11 and second unit 12 are arranged separately on a vehicle and connected with the harness or metallic connecting member 10, and then closing the switch 25 upon completion of the connection.

Still further, the second unit 12 can be used commonly for various types of first units with battery packs 5 having different numbers of rechargeable batteries 2, so that the cost for the battery pack apparatus 1 is decreased.

Figure 3:
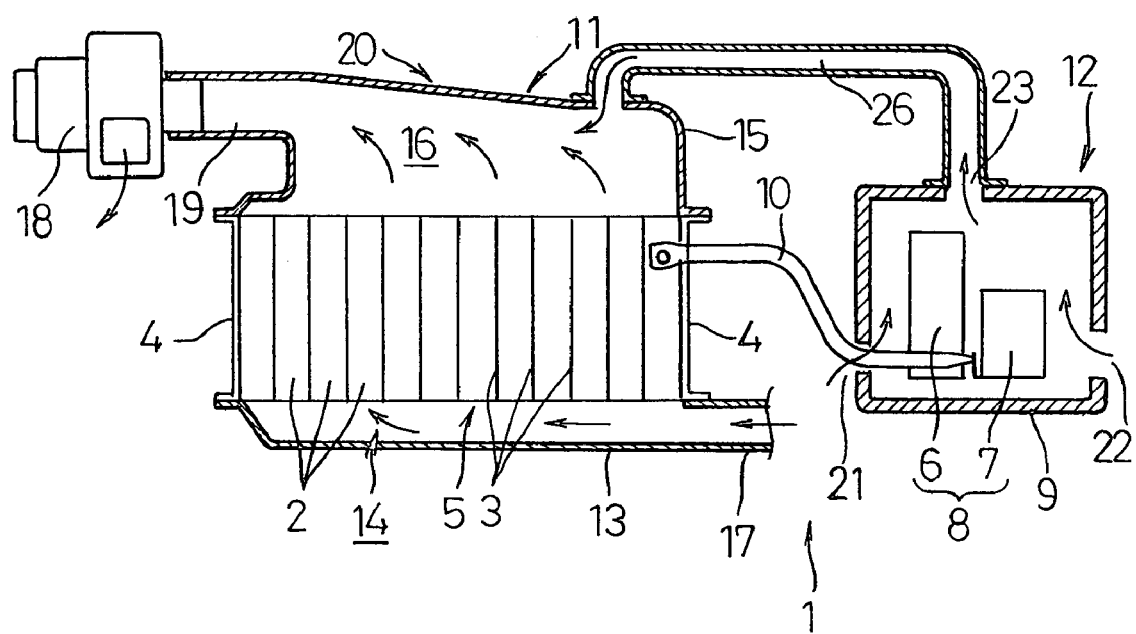
FIG. 3 is a longitudinal sectional front view schematically showing a configuration of a battery pack apparatus according to another embodiment of the invention.
Figure 4:
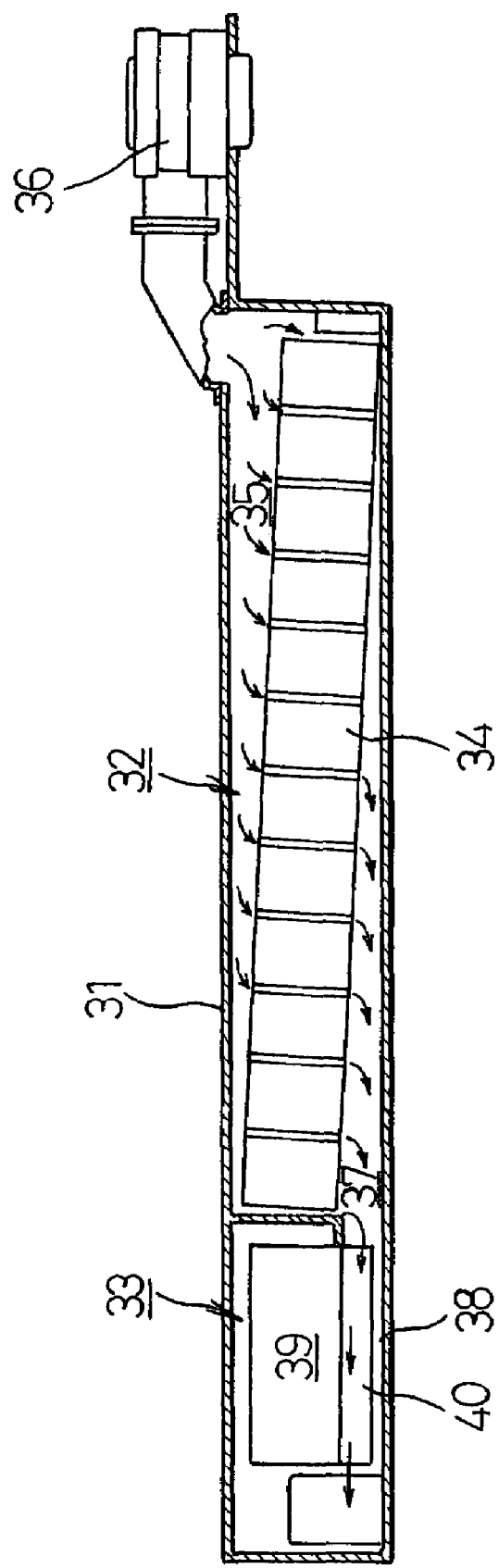
FIG. 4 is a longitudinal sectional front view showing a conventional battery pack apparatus.

Next, a battery pack apparatus according to another embodiment of the invention will be described with reference to FIG. 3. The same elements as the first embodiment are represented by the same reference numerals and description thereof is omitted while only different elements and aspects will be described.

In this second embodiment, an exhaust port 23 is formed in the top wall of a case 9 of a second unit 12 and communicates with a collecting and discharge passage 16 of a cooling medium feeding device 20 by being connected through a duct 26 or tube.

According to this configuration, cooling air is forcibly supplied to the inside of the case 9 by the cooling medium feeding device 20, and hence a control section 8 is cooled still more effectively.

It should be noted that, although the rechargeable batteries in both the embodiments above have been described as flat and prismatic, the rechargeable batteries can take a cylindrical shape and be arranged in parallel, with a cooling medium feeding passage interposed therebetween. A battery pack thus obtained is also capable of providing same effects.

According to the present invention, the battery pack apparatus is constituted by the first unit including the battery pack and the cooling medium feeding device and the second unit having the control section accommodated in the case, while the battery pack of the first unit is connected with the control section of the second unit by means of the harness or metallic connecting member. As a result, the risk is eliminated that hydrogen gas or alkali mist emitted from the rechargeable batteries might enter the control section and the control section might be adversely affected thereby, and thus high security is ensured. Further, since the battery pack apparatus is divided into the first and second units, the battery pack apparatus can be laid out with increased flexibility when mounted. Further, since the second unit can be used commonly for various types of first units with battery packs having different numbers of rechargeable batteries, the cost for the battery pack apparatus is decreased.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack apparatus comprising:
   a battery pack having a plurality of rechargeable batteries arranged in parallel, with a cooling medium passage interposed therebetween;
   a cooling medium feeding device for feeding a cooling medium through the cooling medium passage; and
   a control section for controlling the charge and discharge of the battery pack, wherein the battery pack apparatus comprises a first unit comprising the battery pack and the cooling medium feeding device, and a first case accommodating the battery pack, and a second unit having the control section and a second case accommodating the control section, the first and second cases being separated from each other, the battery pack of the first unit being connected to the control section of the second unit by means of a harness or metallic connecting member, wherein the second case is configured to cool the control section by forcible supply of the cooling medium into the second case.

2. The battery pack apparatus according to claim 1, further comprising a switch for turning electricity on and of, provided at an input/output portion of the battery pack in the first unit.

3. The battery pack apparatus according to claim 1, wherein a vent hole is provided at a lower part of the second case of the second unit and an exhaust port is provided at the top of the second case, the exhaust port being connected to a downstream side passage of the cooling medium passage in the cooling medium feeding device so that the control section is cooled by the forcible supply of the cooling medium.

4. A battery pack apparatus comprising:
   a first unit including:
      a first case;
      a battery pack disposed in the first case;
      a cooling medium feeding device having a feeding passage disposed between a first side of the battery pack and the first case and a discharge passage disposed between a second side of the battery pack and the first case, the feeding passage and the discharge passage collecting and discharging a cooling medium through cooling medium passages of the battery pack;
   a switch for turning electricity on and off to the battery pack;
   a second unit including:
      a second case that is separated from the first case; and
      a control section disposed in the second case, wherein the control section controls a charging and a discharging of the battery pack when the switch is turned on; and
   a harness connecting the control section to the battery pack through the switch wherein the second case is configured to cool the control section by forcible supply of the cooling medium into the second case.

5. A battery pack apparatus according to claim 4, further comprising a duct connecting the exhaust hole with the discharge passage, wherein the cooling medium forcibly supplies cooling air inside the second case to cool the control section.

* * * * *